United States Patent Office 3,553,534
Patented Jan. 5, 1971

3,553,534
METAL-ENCLOSED SWITCHGEAR WITH IMPROVED BUS BAR CONNECTION MEANS
Fred Bould and John H. Taylor, Pittsburgh, Pa., assignors to Westinghouse Electric Corporation, Pittsburgh, Pa., a corporation of Pennsylvania
Filed Dec. 31, 1968, Ser. No. 788,176
Int. Cl. H02b *11/04, 11/06*
U.S. Cl. 317—103                                    17 Claims

ABSTRACT OF THE DISCLOSURE

Each section or cell of a three-phase metal-enclosed switchgear unit, which may include a plurality of cells, has a breaker compartment at the front, a cable compartment at the rear, and a bus or conductor compartment between the cable compartment and the breaker compartment. The bus compartment contains horizontally extending main phase bus bars and vertically extending riser conductors for connecting the bus bars to the circuit breakers, or other circuit controlling devices, by means of stab conductors at different elevations in the breaker compartment. Feeder conductors extend horizontally from the circuit breakers through the bus compartment and terminate in the cable compartment.

BACKGROUND OF THE INVENTION

This invention relates, generally, to switchgear and, more particularly, to metal-enclosed switchgear of a type suitable for relatively low voltage power distribution service to feeder circuits.

A metal-enclosed switchgear installation usually includes or or more units with each unit consisting of a plurality of sections or cells assembled side-by-side to provide a unit capable of housing a desired number of circuit breakers or other circuit controlling devices. The maximum number of cells assembled in a unit at a factory is usually governed by the handling and shipping facilities available. The associated bus bars and riser conductors are interconnected in a suitable manner. The number of circuit breakers in each cell depends upon the size of each breaker.

Each cell structure comprises a framework, as of formed sheet metal construction, and having a breaker compartment at the front, a cable compartment at the rear, and a bus or conductor compartment between the cable compartment and the breaker compartment. The breaker compartment is divided into a plurality of subcompartments for housing individual circuit breakers or other apparatus units. The bus compartment contains main phase bus bars and riser conductors for connecting the bus bars to the circuit breakers. Feeder conductors extending from the circuit breakers through the bus compartment terminate in the cable compartment at the rear of the cell. The cables which supply the various load or feeder circuits with electric power are connected to the feder conductors when the switchgear is installed in service.

Heretofore, the phase bus bars and riser conductors have usually been composed of copper with bolted joints between bus bars and conductors. Present economic conditions make it desirable to utilize aluminum in place of copper, with welded joints between the aluminum bus bars and conductors. Furthemore, it is desirable that all of the welding be performed in the manufacturer's plant by trained personnel. Also, it is desirable that the cells of each shipping unit be completely assembled in the manufacturer's plant.

Accordingly, an object of this invention is to provide a factory-assembled switchgear of the metal-enclosed type in which the joints between main bus bars and riser conductors within the switchgear are of a welded construction.

Another object of the invention is to provide connecting members at the joints which facilitate the welding operations and strengthen the welded joints.

Still another object of the invention is to provide connecting and supporting members for the riser conductors which strengthen the conductors to enable them to withstand short circuit stresses.

Other subjects of the invention will be explained hereinafter or will be apparent to those skilled in the art.

SUMMARY OF THE INVENTION

In accordance with one embodiment of the invention, the associated main phase bus bars and vertical riser conductors and stab conductors in a three-phase metal-enclosed switchgear unit consisting of one or more cells are interconnected by means of welded joints. Unique connectors are provided at certain joints to enable the welding operations to be performed from the rear of the cell structure and to strengthen the joints. Novel supporting and connecting members are provided to retain the conductors in position and enable them to withstand short circuit stresses. All welding of the joints within a shipping unit of switchgear is performed in the manufacturer's plant where the unit is assembled.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENTS

Figure 1:
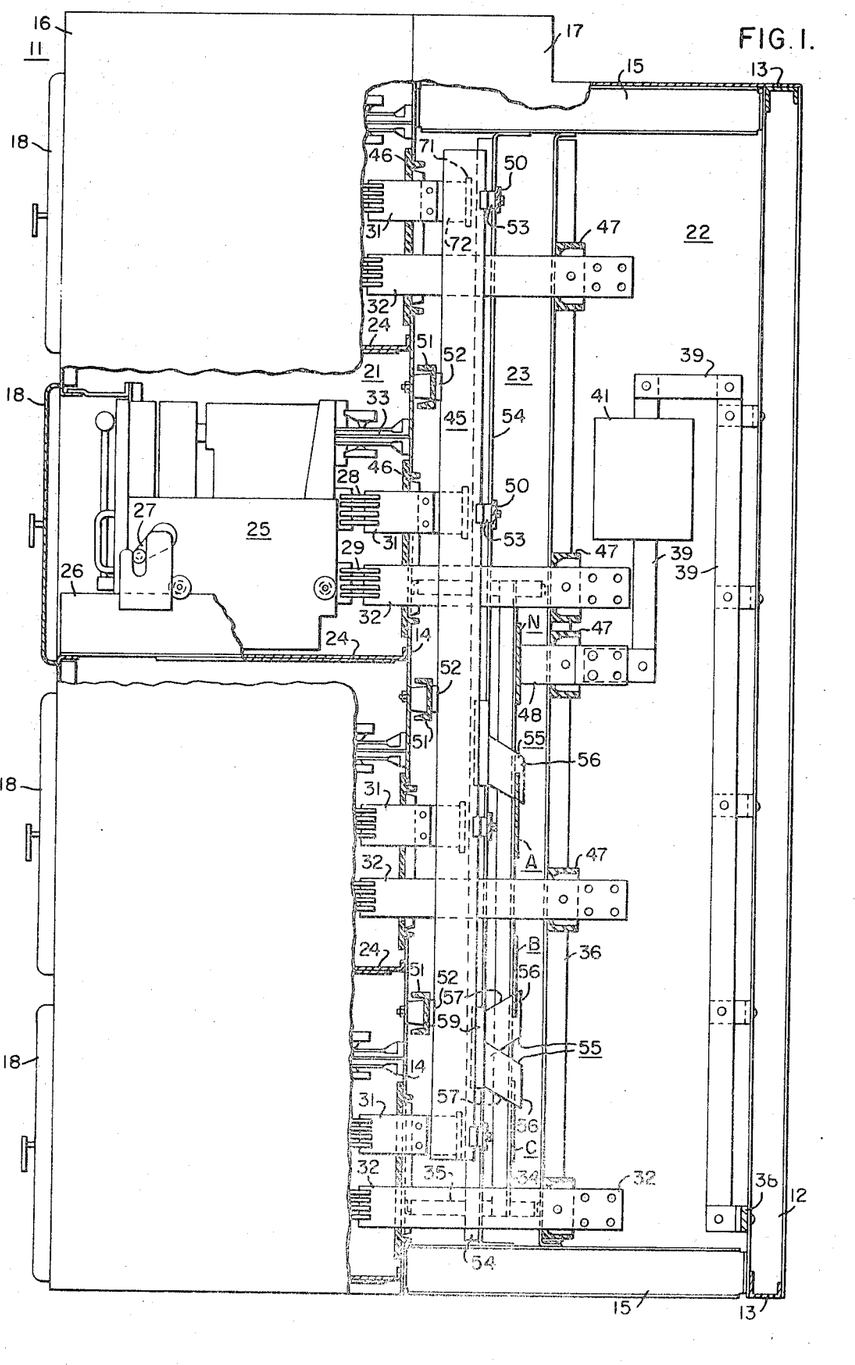
FIG. 1 is a view, partly in side elevation and partly in section, of a metal-enclosed switchgear unit embodying principal features of the invention.
Figure 2:
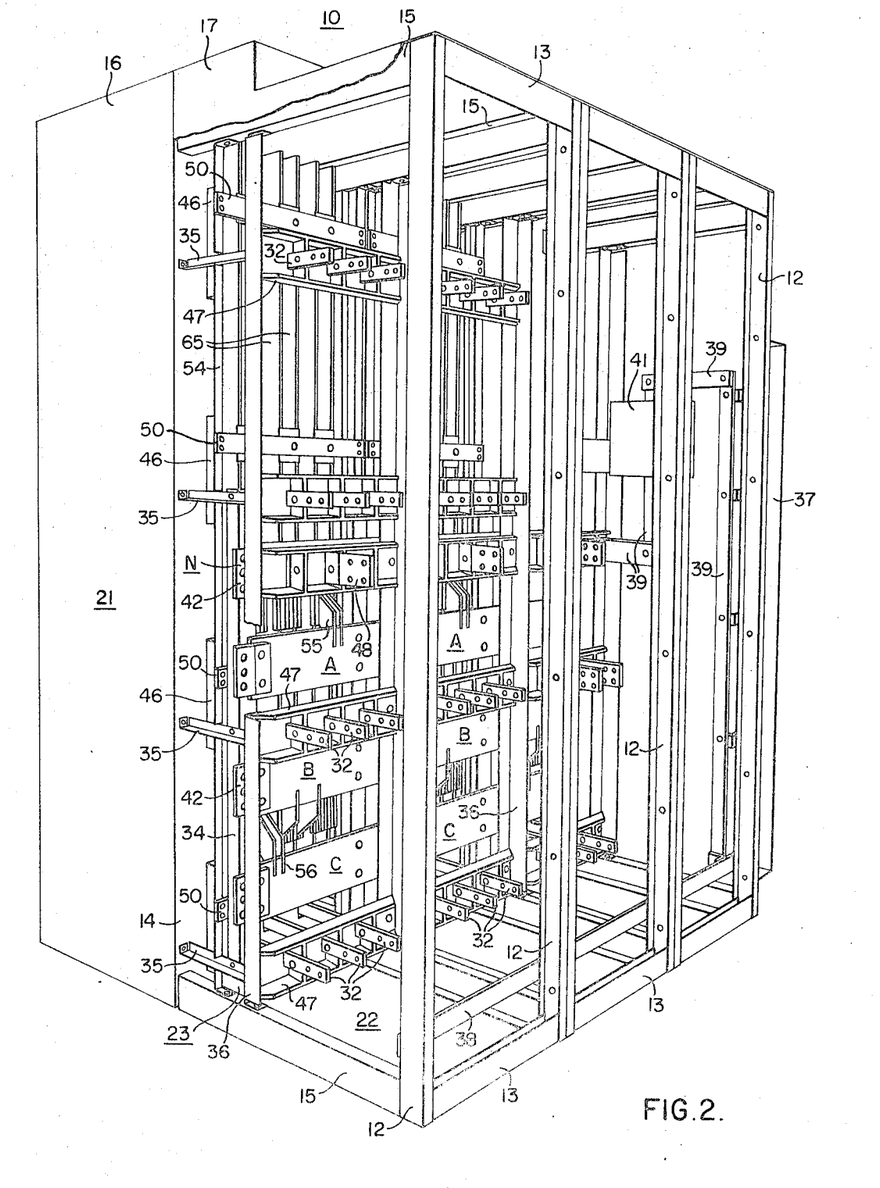
FIG. 2 is a view, in perspective, of the rear of the switchgear unit shown in FIG. 1.

Referring to the drawings, particularly to FIGS. 1 and 2, there is illustrated therein a metal-enclosed switch-gear unit 10 comprising three generally rectangular upstanding sections or cells 11 disposed in side-by-side relation in the switchgear unit. It will be understood that the number of cells in a particular unit may be increased or decreased as desired, the maximum number of cells being limited by the shipping and handling facilities available.

The cell structure may be generally of the type described in Pat. No. 2,424,345, issued July 22, 1947 to C. P. West and assigned to the Westinghouse Electric Corporation. The details of the cell structure will not be described in this application. Generally, it includes vertical channel members 12 joined together at the top and the bottom by horizontal channel members 13, a vertical sheet steel barrier 14 joined to the vertical members 12 by horizontal channel members 15, sheet metal side sheets 16 and 17 attached to frame members of the cell structure and hinged doors 18 at the front of the structure. The frame members may be joined together in any suitable manner, as by welding.

As shown more clearly in FIG. 1, each cell 11 has a breaker compartment 21 at the front of the cell, a cable compartment 22 at the rear of the cell and a bus or conductor compartment 23 between the breaker compartment and the cable compartment. The breaker compartment is separated from the bus compartment by the sheet steel barrier 14. The breaker compartment 21 is divided into a plurality of sub-compartments by horizontal barriers 24. Each sub-compartment may contain an automatic circuit breaker 25, or other circuit controlling device. The circuit breakers 25 may be of the type described in a copending application Ser. No. 770,297, filed Oct. 24, 1968 by Fred Bould and Richard Hauser and assigned to the Westinghouse Electric Corporation. Circuit breakers or other circuit controlling devices of other suitable types may be utilized if desired. Each breaker unit 25 is removably mounted in a sub-compartment on a horizontal track 26. The breaker unit may be actuated to predetermined positions in the cell by means of a suitable levering mechanism 27.

The breaker units 25 are of the multi-pole type and each pole of each breaker has an incoming primary disconnect member 28 and an outgoing primary disconnect member 29. The primary disconnect members may be of the type described in a copending application, Ser. No. 538,996, filed Mar. 31, 1966 by Joseph D. Findley which issued Feb. 11, 1969 as U.S. Pat. 3,427,419 and was assigned to the Westinghouse Electric Corporation. Each incoming primary disconnect member 28 engages a stab conductor 31 and each outgoing primary disconnect member 29 engages a feeder conductor 32 when the breaker unit 25 is in the "connected" position in the breaker compartment 21. Each breaker unit 25 may also be provided with secondary disconnect members 33 which remain in engagement when the breaker unit is in the "test" position in the cell, the primary disconnect members being disengaged in a manner well known in the art.

As shown more clearly in FIG. 1, the bus or conductor compartment 23 contains three main phase bus bars A, B and C and a neutral bar N. As shown in FIG. 2, the bus bars extend horizontally across all three sections or cells of the switchgear unit 10. The bus bars are attached to and supported by vertical insulating members 34 which, in turn, are supported by horizontal angle members 35 extending between a vertical angle member 36 and the vertical barrier 14. The main phase bus bars A, B and C may be connected to a transformer located in a compartment 37 at the one end of the switchgear unit 10. The neutral bar N is connected to a ground bus 38 by means of conductors 39 which extend through a current transformer 41 mounted at one end of the switchgear unit.

Figure 3:
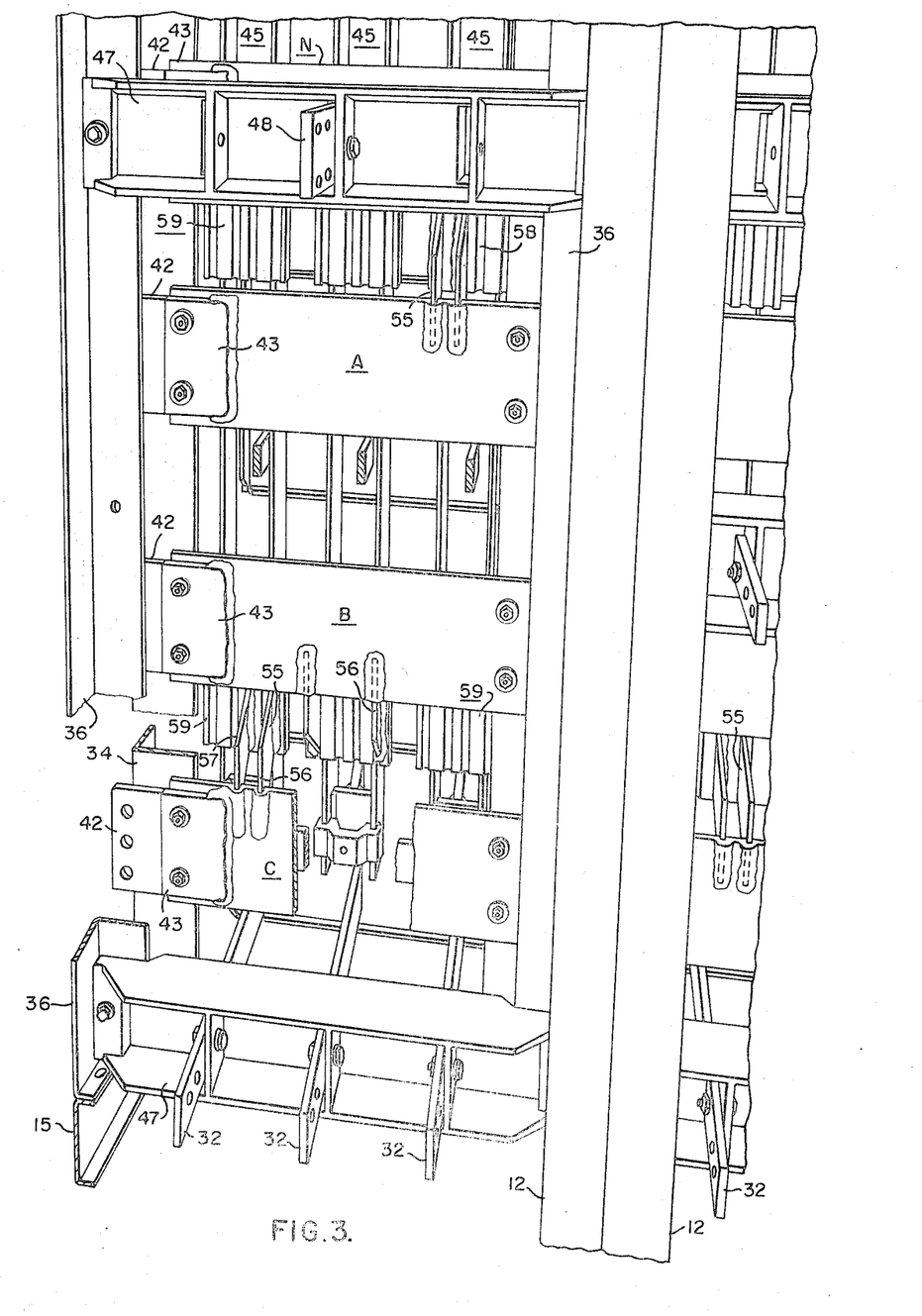
FIG. 3 is an enlarged view, in perspective, of a portion of the structure shown in FIG. 2.

As explained hereinbefore, the main phase bus bars A, B and C and the neutral bar N are preferably composed of aluminum. In order to provide for a shipping break between switchgear units, or to provide for the installing of an additional unit at a future time, a piece of copper 42 and a piece of aluminum 43 are joined together by flash welding and the aluminum piece 43 is then welded to the main bus bar as shown in FIG. 3. One of the flash welded members is provided for each main phase bus bar and for the neutral bar N. A similar flash welded member is provided for each main phase bus bar and neutral bar of the adjoining switchgear unit. The copper portions of the flash welded members may be bolted together in the usual manner. Thus, the bus bars of adjoining units are connected without utilizing bolted connections between aluminum conductors.

The bus compartment for each cell 11 also contains three vertical riser assemblies 45, there being one riser assembly for each phase. Each riser assembly 45 conducts current from one of the main phase bus bars to the corresponding phase stab conductors 31 for the breaker units 25 which are located at different elevations in the breaker compartment of the cell.

As shown in FIGS. 1 and 2, the riser assemblies 45 are connected to the stab conductors 31 for the four breaker units 25 shown in the cell 11. The feeder conductors 32 for the breaker units extend from the breaker compartments 21 through the bus compartment 23 into the cable compartment 22 where they may be connected to the feeder cables (not shown) when the switchgear is installed. The stab conductors 31 are connected to the riser 45 in a manner which will be described hereinafter. The stab conductors 31 and the feeder conductors 32 extend through insulating members 46 mounted in the barrier 14. The feeder conductors 32 also extend through and are attached to insulating members 47 supported by the vertical members 36.

The feeder conductors 32 are preferably composed of copper, each conductor being a one-piece member. The portion of each stab conductor 31 which is engaged by a primary disconnect member is composed of copper. The copper portion is joined to an aluminum portion by flash welding as hereinbefore described. The aluminum portion is connected to the riser conductors in a manner which will be described hereinafter. Combined aluminum and copper members 48 are provided for the neutral bar N. These members extend from the bus compartment into the feeder compartment where they may be connected to cables when the switchgear is installed.

The risers 45 are supported by horizontal insulating members 51 attached to the barrier 14. The risers are attached to the insulators 51 by means of supporting members 52 described more fully hereinafter. The risers 45 are also supported by horizontal insulating members 50 attached to vertical angle members 54 which, in turn, extend between and are attached to the top and bottom horizontal channels 15. The risers are attached to the insulating members 50 by members 53 which are described more fully hereinafter.

Figure 9:
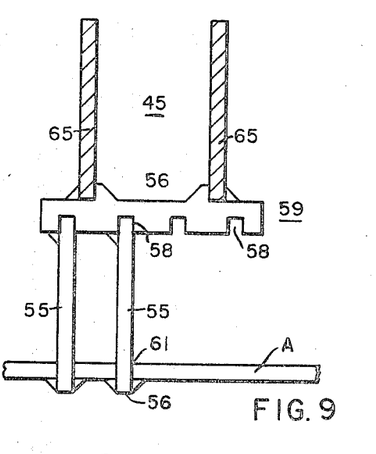
FIG. 9 is an enlarged detail view, partly in plan and partly in section, showing the manner of connecting one of the main phase bus bars to a vertical riser.

Each vertical riser 45 is connected to one of the main phase bus bars by means of two horizontally spaced flat plates 55 which are parallelogrammatic in shape and are spaced longitudinally of the bus bars. Each bus connecting plate 55 has two vertical edges 56 and two diagonal edges 57. One of the vertical edges 56 is disposed in a groove 58 in a bus tie member 59 and the plate 55 is secured to the member 59 by metallurgic bonding, such as welding. The one diagonal edge 57 of each plate is disposed in a notch 61 in the bus bar with the plate 55 extending through the bus bar a short distance to permit welding the vertical edge 56 to the bus bar as shown in FIGS. 3 and 9. As shown in FIGS. 1, 2 and 3, the vertical edges 56 of each plate 55 are at different elevations, thereby permitting the welding of the plates to the members 59 and to the bus bars to be performed from the rear of the switchboard structure.

As shown more clearly in FIGS. 3 and 9, each one of the bus tie members 59 has four horizontally spaced grooves 58 therein. Each bus connector 55 may be located in any one of the grooves 58. Thus, as viewed in FIG. 3, the two plates 55 which connect the phase bus bar A to a vertical riser 45 are located in the two left-hand grooves 58 which are the furthest away from the vertical member 36. The two plates 55 which connect the phase bus bar B to the middle vertical riser 45 are located in the two outside grooves 58 in the member 59. The two bus connectors or plates 55 which connect the phase bus bar C to the left-hand vertical riser 45 are located in the two right-hand grooves 58 in the bus tie member 59. In this manner, sufficient clearance distance between the bus connector plates 55 and the nearest grounded member is maintained.

Figure 4:
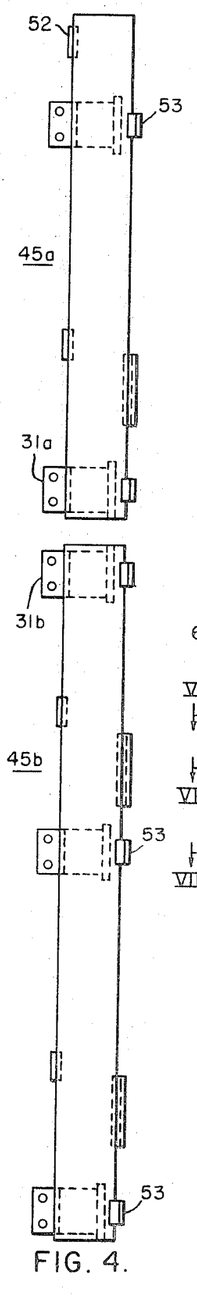
FIG. 4 is a view, in side elevation, of a modified vertical riser assembly suitable for use with a bus-tie circuit breaker.
Figure 5:
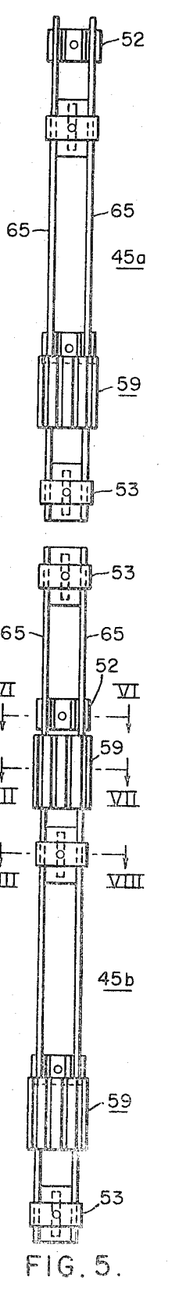
FIG. 5 is a view, in rear elevation, of the vertical riser shown in FIG. 4.

As shown in FIG. 1, all four breaker units 25 are connected to the vertical risers 45. If desired, each vertical riser 45 may be divided into two sections 45a and 45b as shown in FIGS. 4 and 5. This arrangement is suitable for use with a bus-tie breaker which engages stab connectors 31a and 31b shown in FIG. 4, thereby electrically connecting the two riser sections 45a and 45b when the bus-tie breaker is closed. In this manner, a power distribution system may be sectionalized, as is well known in the art.

Figure 6:
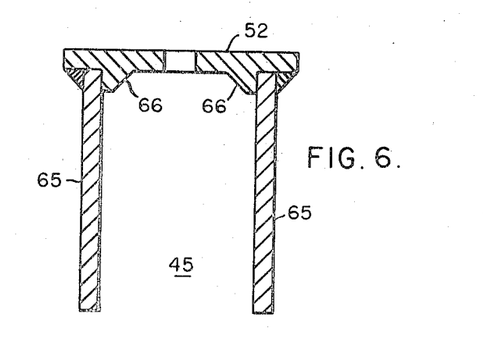
FIGS. 6, 7 and 8 are enlarged views, in section, taken along lines VI—VI, VII—VII and VIII—VIII, respectively, in FIG. 5.
Figure 7:
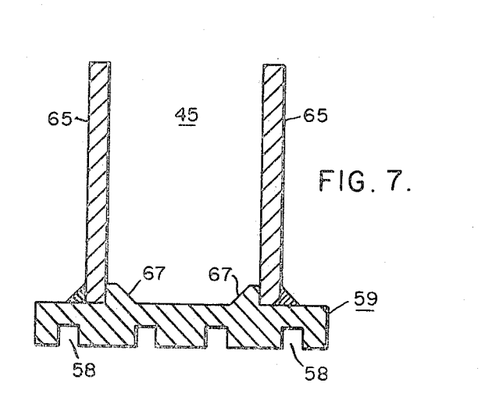

As shown more clearly in FIGS. 6 and 7, each vertical riser assembly 45 comprises two horizontally spaced vertically extending generally rectangular in cross section bars or conductors 65. The edges of the bars nearest the front of the structure are joined together by the connecting members 52 each one of which has projections 66 thereon engaging the inner oppositely disposed sides of the bars 65. The bars 65 are welded to each connecting and supporting member 52 with the welded joint being formed between the member 52 and the side of each bar opposite the side engaged by the projection 66. Thus, the projections 66 strengthen the welded joints and enable the conducting bars 65 to withstand short circuit stresses which have a tendency to pull the two bars together.

As shown in FIG. 7 the two bars 65 of each riser assembly 45 are also joined together by the members 59 which are welded to the edges of the bars 65 nearest the rear of the structure. The members 59 also have projections 67 thereon which engage the inner opposite sides of the bars 65, thereby strengthening the welded joint between the bars and the member 59.

As previously explained, the bus connectors 55 are disposed in grooves 58 and the members 59. The grooves 58 position the bus connectors 55 and also strengthen the welded joints between the members 55 and the member 59. The manner of welding the bus connectors 55 to the member 59 is shown in FIG. 9 and has been previously described.

Figure 8:
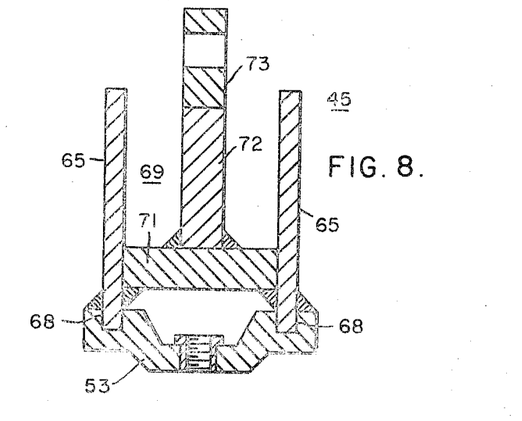

The two vertical bars 65 of each riser assembly are also joined together by the connecting and supporting members 53 as shown in FIG. 8. Vertical edges of the bars 65 are disposed in grooves 68 in each member 53. The bars 65 are welded to each member 53 as shown in FIG. 8. Thus, the grooves 68 strengthen the welded joints and maintain the bars 65 in spaced relation.

As also shown in FIG. 8, stab conductor support assemblies 69 are disposed between the vertical bars 65 of each riser assembly 45. Each assembly 69 comprises a generally rectangular member 71 extending between and joined to the opposite inner sides of the bars 65, and a generally rectangular member 72 joined to the side of the member 71 nearest the front of the structure. The conductors 65, 71 and 72 are preferably aluminum and are joined together by metallurgical bonding, such as welding. A copper member 73 is joined to the member 72 by flash welding. As previously explained the stab conductors 31 are copper and they may be bolted to the copper members 73, thereby providing a bolted joint between copper members. The riser assemblies 45 may be preassembled and the welding between the joints of the riser members performed before they are installed in the bus compartment 23. In this manner the welding of the joints is facilitated.

Figure 10:
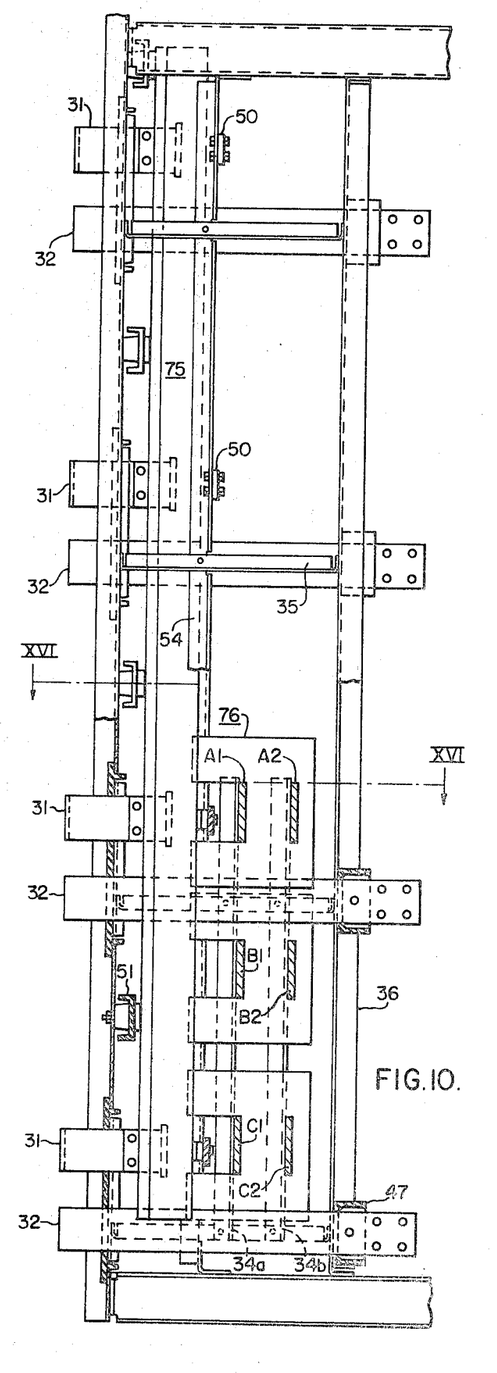
FIG. 10 is a view, partly in side elevation and partly in section, of a bus compartment structure having a higher current capacity than the structure shown in FIGS. 1 and 2.

The bus structure and riser assembly shown in FIG. 10 has a higher current carrying capacity than the corresponding structures shown in FIGS. 1 and 2. As shown in FIG. 10, the bus structure comprises three sets of horizontally extending main phase bus bars with each set including two laterally spaced generally rectangular in cross section bars A1 and A2 for phse A, B1 and B2 for phase B, and C1 and C2 for phase C. The bus bars are supported by insulating support members 34a and 34b.

Figures 18, 19:
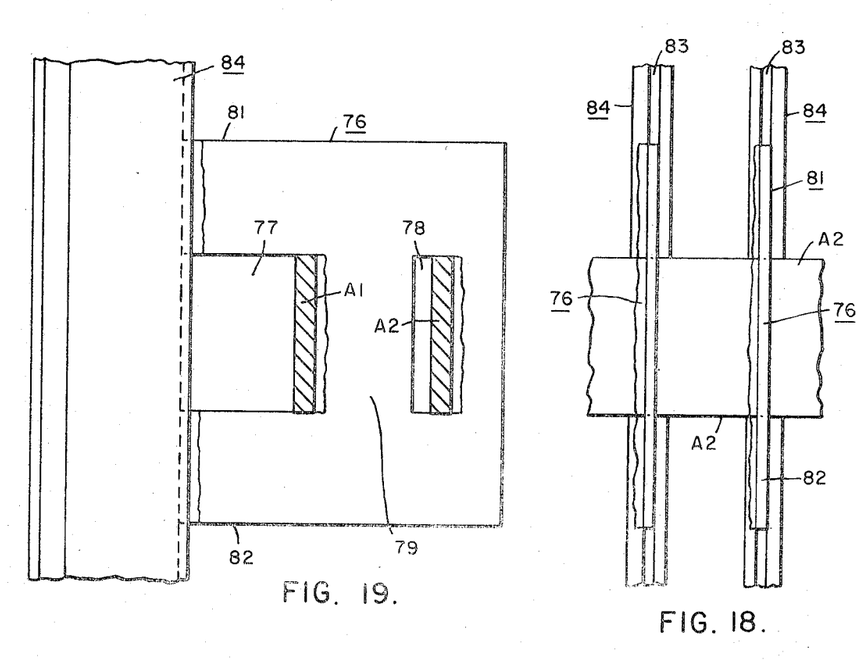
FIG. 18 is a detailed view, in rear elevation, of the welded joints shown in FIG. 17.
FIG. 19 is a detail view, partly in side elevation and partly in section, of the welded joints shown in FIGS. 17 and 18.

The bus bars of each set are connected to a riser assembly 75 by means of two horizontally spaced generally rectangular substantially flat bus connectors 76. As shown more clearly in FIG. 19, each bus connector 76 has a notch 77 in one side thereof in which one phase bus bar for example A1 is disposed and an opening 78 therein in which the other phase bus bar, for example, A2, is disposed. Thus, each plate 76 has a portion 79 extending between the two bus bars and portions 81 and 82 extending into a groove 83 in each one of two vertical riser conductors 84 as shown in FIG. 18.

Figure 17:
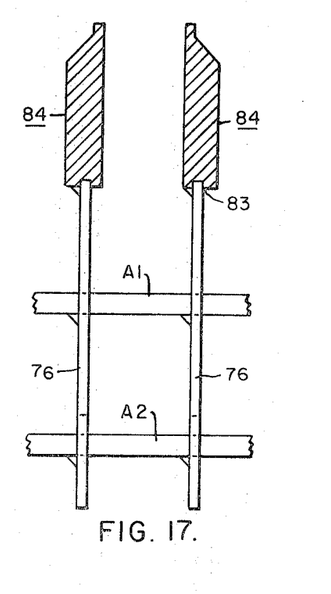
FIG. 17 is an enlarged detail view, partly in plan and partly in section, showing a manner of making welded joints between main phase bus bars and bus connectors and between the bus connectors and vertical risers.

Each bus connector 76 is welded to the phase bus bars and to the riser conductor 84. As shown in FIGS. 17, 18 and 19, the location of the welds is such that the welding may be performed from the rear of the structure. Since the portion 81 of each bus connector 76 is above the phase bus bars and the portion 82 is below the phase bus bars to which the plate 76 is joined, the welding of the joints between the bus connectors 76 and the riser conductors 84 may be performed from the rear of the structure. Likewise, each bus connector 76 may be welded to the phase bus bar A1 since it is located at the rear of the notch 77 in the connector 76. The connector may be welded to the bus bar A2 since it is located at the rear of the opening 78 in the connector 76. The bus connectors 76 for the phase bus bars B1 and B2 and C1 and C2 may be welded to the phase bus bars and to the riser conductors 84 in a similar manner.

Figure 11:
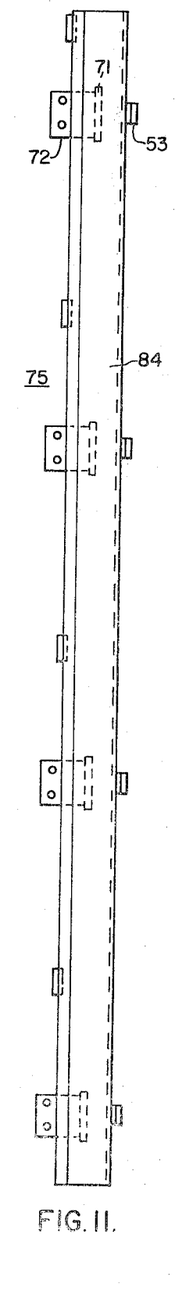
FIGS. 11 and 12 are views, in side and rear elevation, respectively, of one of the riser assemblies utilized in the structure shown in FIG. 10.
Figure 12:
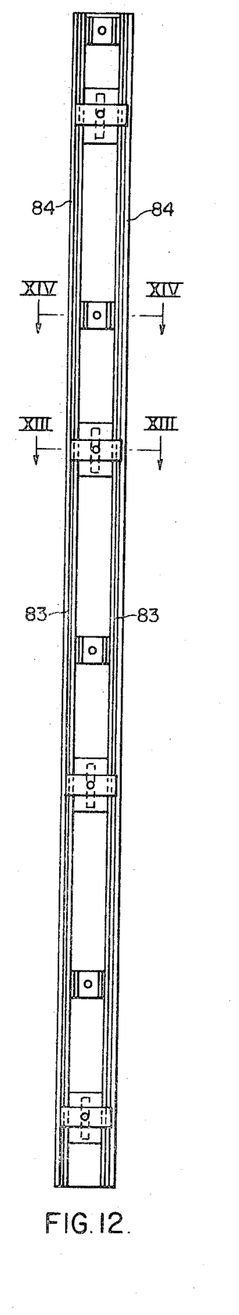

As shown in FIGS. 11 and 12, each riser assembly 75 includes two horizontally spaced vertically extending generally rectangular conductors 84 which are thicker than the conductors 65 of the riser assemblies 45. As previously explained, each conductor 84 has a groove 83 in one edge for receiving one of the bus connectors 76.

Figure 13:
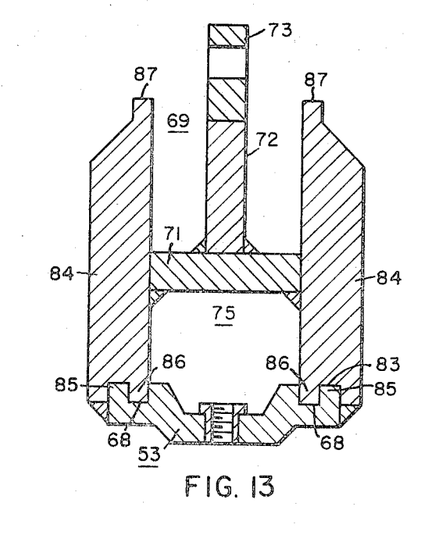
FIGS. 13 and 14 are enlarged views, in section, taken along the lines XIII—XIII and XIV—XIV, respectively, in FIG. 12.

As shown in FIG. 13, the connecting and supporting members 53 have portions 85 disposed in the grooves 83, and the conductors 84 have portions 86 disposed in the grooves 68 in the member 53. The member 53 is welded to the conductors 84 in the manner shown in FIG. 13. Thus, the interlocking projections and grooves strengthen the welded joints.

Figure 14:
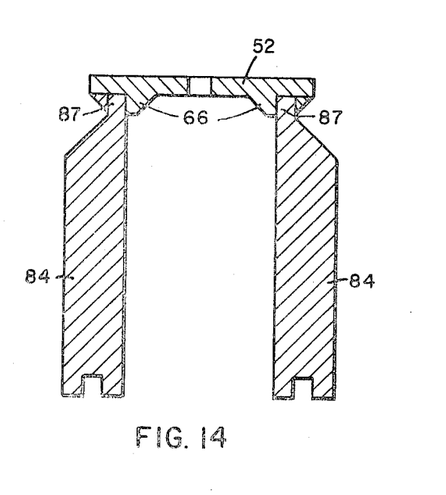

As shown more clearly in FIG. 14, each conductor 84 has a projection 87 thereon which engages a projection 66 on the supporting member 52. The member 52 is welded to the conductors 84 in the manner shown in FIG. 14. Thus, the same members 52 and 53 may be utilized with the riser conductors 84 and welded to these conductors in a manner similar to that in which they are welded to the conductors 65 as previously described. Likewise, as shown in FIG. 13, the members 71 and 72 of the stab conductor support assembly 69 may be welded together and the member 71 welded to the inner oppositely disposed sides of the riser conductors 84.

Figure 15:
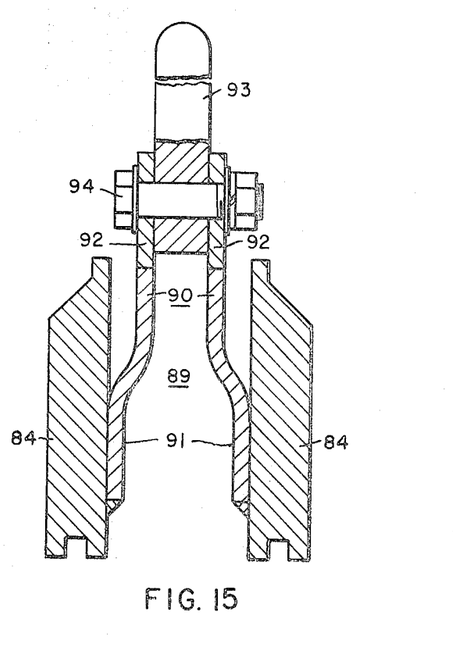
FIG. 15 is a view, similar to FIG. 13, of a modified stab support assembly.

The assembly 89 shown in FIG. 15 has a higher current capacity than the assembly 69. The assembly 89 comprises two spaced conductors 90 each one of which has an aluminum portion 91 welded to the inner side of one of the riser conductors 84 and a copper portion 92 flash welded to the aluminum portion 91. A stab conductor 93 is disposed between the copper portions 92 and attached to these portions by bolts 94.

Figure 16:
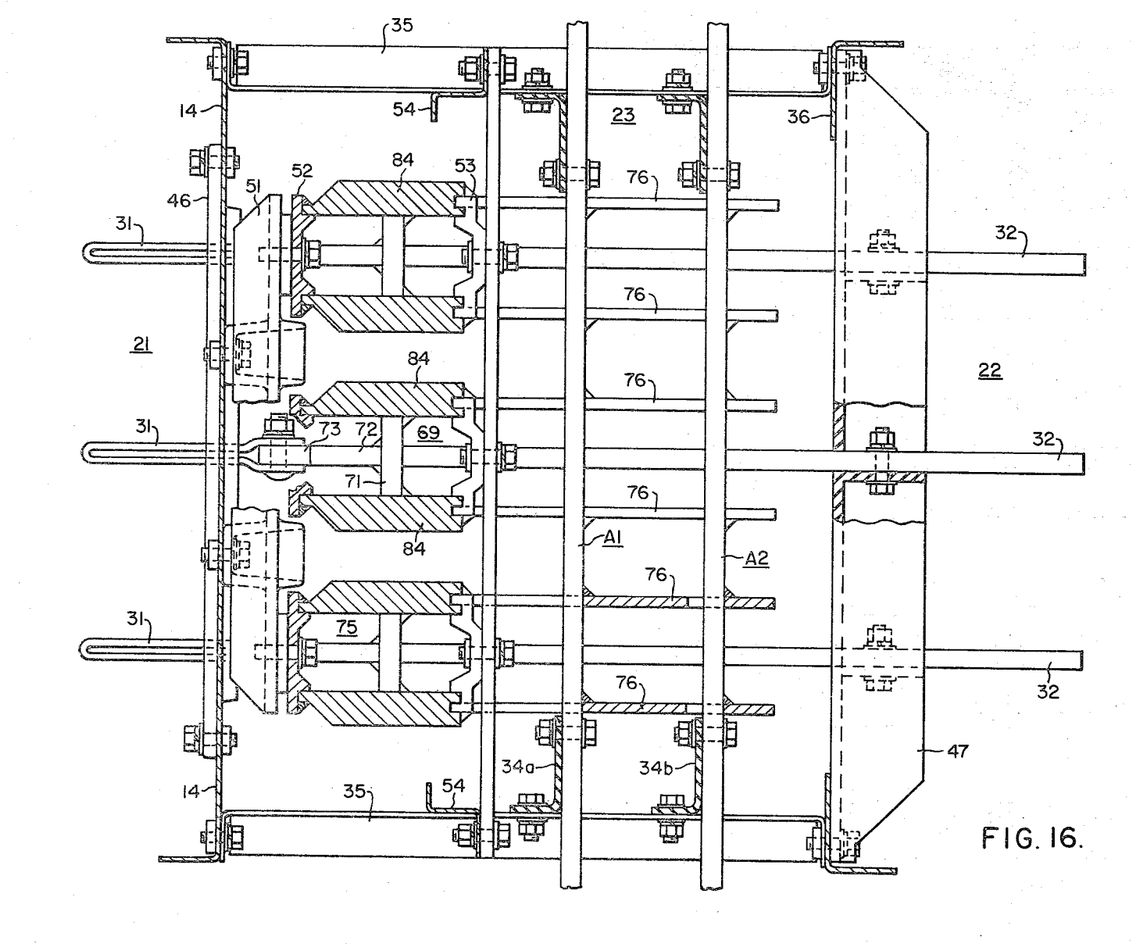
FIG. 16 is an enlarged view, partly in plan and partly in section, taken along the line XVI—XVI of FIG. 10.

The general arrangement and manner of supporting the conductors in the bus compartment 23 is shown in FIG. 16. In this embodiment of the invention two bus bars per phase are provided. In the embodiment shown in FIGS. 1 and 2 only one bus bar per phase is provided. Each bus bar is attached to a vertical insulating member 34, or 34a or 34b when two bus bars per phase are provided. The insulating members 34 are attached to horizontally disposed members 35 which extend between and are attached to the vertical barrier 14 and the vertical angle member 36.

The vertical riser assemblies 75, or 45 in the case of the embodiment shown in FIGS. 1 and 2, are attached to insulating cross members 50 by the supporting and connecting members 53, and also to insulating cross members 51 by support members 52. The insulating members 50 are attached to vertical members 54. The insulating members 51 are attached to the vertical barrier 14. The stab conductors 31 are bolted to the copper portions 73 of the stab conductor assemblies 69. In case the arrangement shown in FIG. 15 is utilized, stab conductors 93 are bolted to copper portions 92 of the stab conductor assembly 89.

As explained hereinbefore, the feeder conductors 32 are one piece copper members which extend from the breaker compartment 21 through the bus compartment 23 into the feeder compartment 22. The feeder conductors 32 are supported by insulating cross members 47 which are attached to the vertical members 36. Both the stab conductors 31 and the feeder conductors 32 are supported by the insulating members 46 which are attached to the vertical barrier 14.

As previously explained, the members 52 and 53 may be utilized with either the riser conductors 84, or with the riser conductors 65 in the embodiment of the invention shown in FIGS. 1 and 2. In case two main bus bars per phase are provided, they are connected to the riser conductors by the bus connector 76 two of which are provided for each riser assembly. In case one main bus bar per phase is provided, it is connected to a riser assembly by two bus connectors 55 in the manner hereinbefore described. Thus, suitable conductors may be provided for any desired current rating and they may be readily assembled in the switchgear structure. Since some of the parts may be utilized with any current rating, the total number of parts required is reduced.

Figure 20:
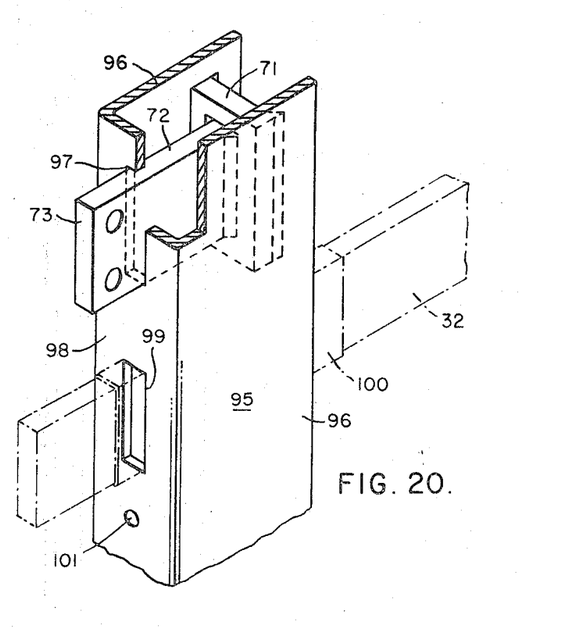
FIG. 20 is an isometric view of a portion of a modified vertical riser and horizontal conductor arrangement.

In the modification of the invention shown in FIG. 20, a generally channel-shaped member 95 is utilized as a vertical riser conductor in place of the two spaced rectangular conductors 65 provided in the embodiment shown in FIGS. 1 and 2. The member 71 of the stab conductor assembly is welded to the inner faces of the sides 96 of the channel member 95, and the conductor 72 extends through an opening 97 in the base 98 of the channel member 95. A suitable stab conductor, such as the conductor 31, may be bolted to the copper portion 73 of the stab conductor assembly. The channel member 95 is preferably composed of aluminum and the members 71 and 72 are aluminum with the copper portion 73 being flash welded to the aluminum members 72.

The feeder conductor 32 extends through an opening 99 in the base 98 of the channel member 95. An insulating sleeve 100 is provided on the feeder conductor 32 to insulate it from the channel member 95. As previously stated, the feeder conductor 32 is preferably composed of copper.

The channel member 95 may be bolted by bolts extending through holes 101 to an insulating cross member, such as the member 51 hereinbefore described. Each main phase bus bar may be connected to a channel member by means of bus connectors 55 and bus tie members 59 in a manner similar to that described with reference to riser conductors 65. Since the channel member 95 is inherently rigid in structure, it does not require as many supporting members as are required when two separate rectangular channel conductors are utilized for each vertical riser.

From the foregoing description, it is apparent that the invention provides a switchgear structure which is particularly suitable for utilizing aluminum conductors which are joined together by welding. However, certain features of the invention are not necessarily limited to the utilization of aluminum conductors. The conductors are so arranged that all the welding operations are performed in the plant of the manufacturer and the welding operations may be performed from the rear of the structure when the switchgear is assembled. Furthermore, conductors having different current capacities may be readily assembled in the structure and certain parts of the structure may be utilized with different current capacity conductors.

Since numerous changes may be made in the above described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. Metal-enclosed switchgear comprising a generally rectangular cell structure having a breaker compartment at the front and a cable compartment at the rear and a bus compartment between the breaker compartment and the cable compartment, multi-pole circuit controlling devices removably mounted in the breaker compartment at different elevations, each pole of each device having incoming and outgoing primary disconnect members, at least three horizontally extending main phase bus bars mounted in the bus compartment, at least three vertical risers mounted in the bus compartment, stab conductors connected to said risers and extending into the breaker compartment, said stab conductors being engaged by said incoming disconnect members, at least two one-piece bus connectors connecting each one of the main phase bus bars to one of said risers, said bus connectors being spaced longitudinally of said bus bars, each bus connector having a pair of opposite end portions joined respectively to a bus bar and to a riser by metallurgical bonding, and said pair of opposite end portions of each bus connector being at different elevations to be readily accessible from the rear of the cell structure.

2. The switchgear defined in claim 1, including feeder conductors each having one end disposed in the breaker compartment, said feeder conductors being engaged by said outgoing disconnect members and extending horizontally through the bus compartment into the cable compartment.

3. The switchgear defined in claim 1, wherein each riser includes at least two horizontally spaced vertically extending generally rectangular in cross section conductors, said stab conductors are connected to oppositely disposed flat sides of said riser conductors, and including supporting and connecting members bridging edges of said conductors, said members having projections overlapping sides of said conductors, and said members being joined to said conductors, by metallurgical bonding.

4. The switchgear defined in claim 1, wherein the main phase bus bars have notches therein receiving edges of said bus connectors.

5. The switchgear defined in claim 4, including bus tie members having spaced projections on one side engaging vertical riser conductors and spaced grooves on the other side receiving other edges of said bus connectors.

6. Metal-enclosed switchgear comprising an upstanding cell structure having a breaker compartment at the front and a bus compartment at the rear of the breaker compartment, circuit controlling devices mounted in the breaker compartment at different elevations, at least three sets of horizontally extending main phase bus bars mounted in the bus compartment, each set including two laterally spaced generally rectangular in cross section bars, at least three sets of vertical risers mounted in the bus compartment, each set including two horizontally spaced vertically extending generally rectangular in cross section conductors, stab conductors disposed between and joined to flat sides of said riser conductors by metallurgical bonding releasably connecting said riser conductors to said devices, supporting and connecting members bridging edges of said riser conductors, said members having projections overlapping sides of said riser conductors, said members being joined to said conductors by metallurgical bonding, and at least two bus connectors connecting each set of the main phase bus bars to one set of risers, said bus connectors being spaced longitudinally of said bus bars.

7. The swtichgear defined in claim 6, wherein each vertical riser conductor is connected to one of said bus connectors.

8. The switchgear defined in claim 7, each vertical riser conductor has a longitudinal groove in one edge receiving one of said bus connectors.

9. The switchgear defined in claim 6, wherein each bus connector has a portion disposed between the two bus bars of a set of main phase bus bars.

10. The switchgear defined in claim 6, wherein joints between main phase bus bars, bus connectors and riser conductors are accessible from the rear of the cell structure for forming by metallurgical bonding.

11. The switchgear defined in claim 6, wherein each bus connector is a substantially flat generally rectangular plate having a notch in one side thereof and an opening through the plate.

12. The switchgear defined in claim 11, wherein one main bus bar is disposed in said notch and another main bus bar extends through the opening in the plate.

13. The switchgear defined in claim 8, wherein each bus connector is a substantailly flat generally rectangular vertically disposed plate having a notch in one side thereof and an opening through the plate with portions of the plate above and below the notch disposed in the groove in the riser conductor.

14. The switchgear defined in claim 1, wherein each bus connector is a substantially flat vertically disposed parallelogrammatic plate having two vertical edges and two diagonal edges.

15. The switchgear defined in claim 14, wherein one vertical edge of each plate is secured to a bus bar and the other vertical edge is secured to a riser by metallurgical bonding.

16. The switchgear defined in claim 2, wherein each riser is a chanel-shaped member having openings in its base through which stab conductors and feeder conductors extend.

17. The switchgear defined in claim 16, wherein the stab conductors are connected to the sides of the channel-shaped member, and the feeder conductors are insulated from said member.

References Cited

UNITED STATES PATENTS

| | | | |
|---|---|---|---|
| 2,707,761 | 5/1955 | Page | 317—119 |
| 2,738,446 | 3/1956 | Fleming | 317—119 |
| 3,308,348 | 3/1967 | Olashaw | 317—119 |
| 3,349,291 | 10/1967 | Olashaw | 317—99X |

LEWIS H. MYERS, Primary Examiner

G. P. TOLIN, Assistant Examiner

U.S. Cl. X.R.

317—99